(12) United States Patent
Murakami

(10) Patent No.: US 11,308,469 B2
(45) Date of Patent: Apr. 19, 2022

(54) ELECTRONIC DEVICE, SALES DATA PROCESSING SYSTEM, AND COMPUTER-READABLE RECORDING MEDIUM

(71) Applicant: CASIO COMPUTER CO., LTD., Tokyo (JP)

(72) Inventor: Bungo Murakami, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 147 days.

(21) Appl. No.: 16/441,429

(22) Filed: Jun. 14, 2019

(65) Prior Publication Data

US 2019/0392413 A1    Dec. 26, 2019

(30) Foreign Application Priority Data

Jun. 21, 2018  (JP) .............................. JP2018-118309

(51) Int. Cl.
```
G06Q 20/20   (2012.01)
G07G 1/00    (2006.01)
G07G 1/01    (2006.01)
G07G 1/12    (2006.01)
```

(52) U.S. Cl.
CPC ......... *G06Q 20/202* (2013.01); *G06Q 20/208* (2013.01); *G07G 1/0009* (2013.01); *G07G 1/0018* (2013.01); *G07G 1/01* (2013.01); *G07G 1/12* (2013.01)

(58) Field of Classification Search
CPC combination set(s) only.
See application file for complete search history.

(56) References Cited

U.S. PATENT DOCUMENTS

| | | |
|---|---|---|
| 9,892,397 B2 | 2/2018 | Suzuki |
| 10,068,216 B2 | 9/2018 | Suzuki |
| 2008/0224950 A1* | 9/2008 | Hashimoto ............ G09G 5/005 345/1.3 |
| 2013/0229352 A1 | 9/2013 | Tsutsumi et al. |
| 2017/0078504 A1* | 3/2017 | Nagata ............... G03G 15/5016 |
| 2017/0185363 A1* | 6/2017 | Ting ..................... G06F 1/1626 |
| 2017/0364887 A1 | 12/2017 | Dullings et al. |
| 2018/0341940 A1 | 11/2018 | Suzuki |

FOREIGN PATENT DOCUMENTS

| | | |
|---|---|---|
| JP | 2015018521 A | 1/2015 |
| JP | 2015026169 A | 2/2015 |
| JP | 2015035153 A | 2/2015 |

OTHER PUBLICATIONS

Extended European Search Report (EESR) dated Sep. 16, 2019 issued in European Application No. 19180597.7.

\* cited by examiner

*Primary Examiner* — Peter Ludwig
*Assistant Examiner* — Reva R Moore
(74) *Attorney, Agent, or Firm* — Holtz, Holtz & Volek PC

(57) ABSTRACT

An electronic device of the present invention is an electronic device including a display operation unit in which a display function and an operation function are integrated together, the electronic device including a processor configured to execute processing below, in which the processing, when communication connection is made with a predetermined sales data processing apparatus, includes control processing of substituting either one or both of a display unit and an operation unit arranged on the sales data processing apparatus for at least part of a function of the display operation unit.

15 Claims, 13 Drawing Sheets

*FIG. 7*

| ALL ITEMS | | |
|---|---|---|
| GLASS WINE | 2 | ¥1,600 |
| CRAFT BEER | 1 | ¥980 |
| COCKTAIL | 1 | ¥700 |
| SAKE | 1 | ¥1,200 |
| GREEN TEA | 1 | ¥300 |

—480

ELECTRONIC DEVICE, SALES DATA PROCESSING SYSTEM, AND COMPUTER-READABLE RECORDING MEDIUM

CROSS-REFERENCE TO RELATED APPLICATIONS

This application is based upon and claims the benefit of priority from the prior Japanese Patent Application No. 2018-118309, filed on Jun. 21, 2018, the entire contents of which are incorporated herein by reference.

BACKGROUND OF THE INVENTION

1. Field of the Invention

The present invention relates to an electronic device, a sales data processing system, and a computer-readable recording medium.

2. Description of the Related Art

Cash registers on which display operation units such as a numeric keypad and a display are arranged are widely used conventionally, in stores selling products and providing food and drink. In addition, as described in JP 2015-18521 A, an information processing apparatus is known that is made to function as a cash register, in which a printer and a display are connected to a tablet terminal via an interface board.

By the way, if a tablet terminal is used communicably connected to the cash register, it becomes possible to perform order receiving work of food and drink near a customer table. In addition, if the tablet terminal is placed on the cash register, it is also possible to support many applications, such as extending a function of the cash register. As described above, when it is considered that the tablet terminal is placed on the cash register for cooperation, if the tablet terminal is made to have a function as the cash register as it is, functions are duplicated between the tablet terminal's display operation unit and the cash register's display unit and operation unit. Since the tablet terminal's display operation unit has a limitation in size, there is a problem that a limited display operation area cannot be effectively used.

The present invention has been made to solve such a problem, and it is an object to provide an electronic device, a sales data processing system, and a computer-readable recording medium enabled to efficiently registering information.

SUMMARY OF THE INVENTION

To solve the above problem, an electronic device of the present invention is an electronic device including a display operation unit in which a display function and an operation function are integrated together, the electronic device including a processor configured to execute processing below, in which the processing, when communication connection is made with a predetermined sales data processing apparatus, includes control processing of substituting either one or both of a display unit and an operation unit arranged on the sales data processing apparatus for at least part of a function of the display operation unit.

In addition, a sales data processing system of the present invention is a sales data processing system including a sales data processing apparatus and an electronic device communicably connected to each other, the sales data processing apparatus including a display unit and an operation unit, the electronic device including a display operation unit in which a display function and an operation function are integrated together, in which the electronic device includes a processor configured to execute processing below, in which the processing, when communication connection is made with the sales data processing apparatus, includes control processing of substituting either one or both of the display unit and the operation unit for at least part of a function of the display operation unit.

In addition, a computer-readable recording medium of the present invention is a non-transitory computer-readable recording medium for causing a computer to execute a procedure below, the computer being included in a sales data processing system including a control unit configured to control a display operation unit in which a display function and an operation function are integrated together, and a communication unit configured to make communication connection with a sales data processing apparatus in which a display unit and an operation unit are arranged, in which the procedure, when communication connection is made with the sales data processing apparatus by the communication unit, includes control processing of substituting either one or both of the display unit and the operation unit for at least part of a function of the display operation unit.

BRIEF DESCRIPTION OF THE DRAWINGS

FIG. 7 is a diagram illustrating an example of a screen on which all items are displayed;

Figure 1:
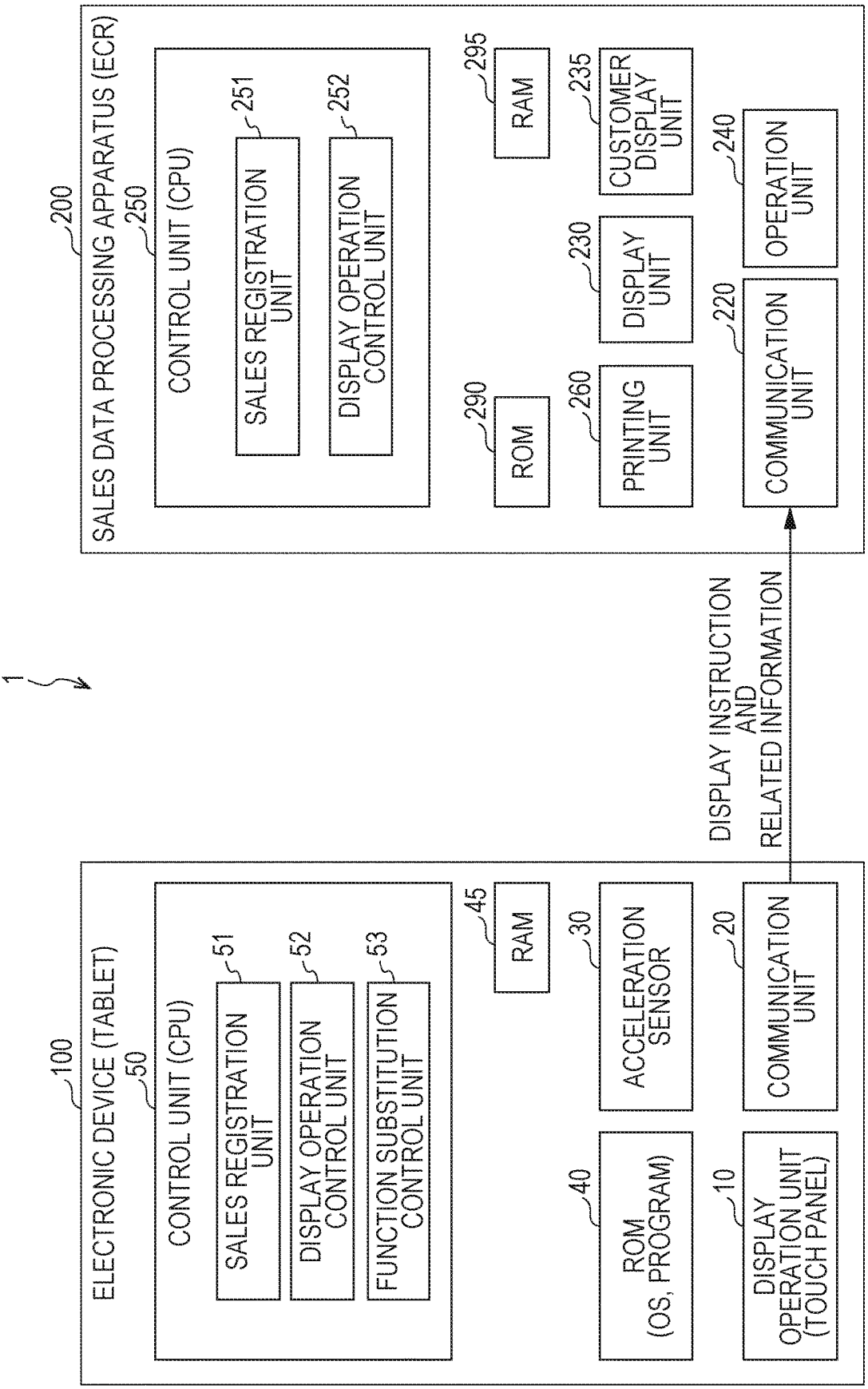
FIG. 1 is an overall configuration diagram of a sales data processing system that is an embodiment of the present invention.

DETAILED DESCRIPTION OF THE
PREFERRED EMBODIMENTS

Hereinafter, embodiments of the present invention (hereinafter, referred to as "the present embodiments") will be described in detail with reference to the drawings. Note that, the drawings are only schematically illustrated to an extent that the present embodiments can be sufficiently understood. In addition, in each figure, common components or similar components are denoted by the same reference numerals, and duplicate description thereof will be omitted.

First Embodiment

Figure 2:
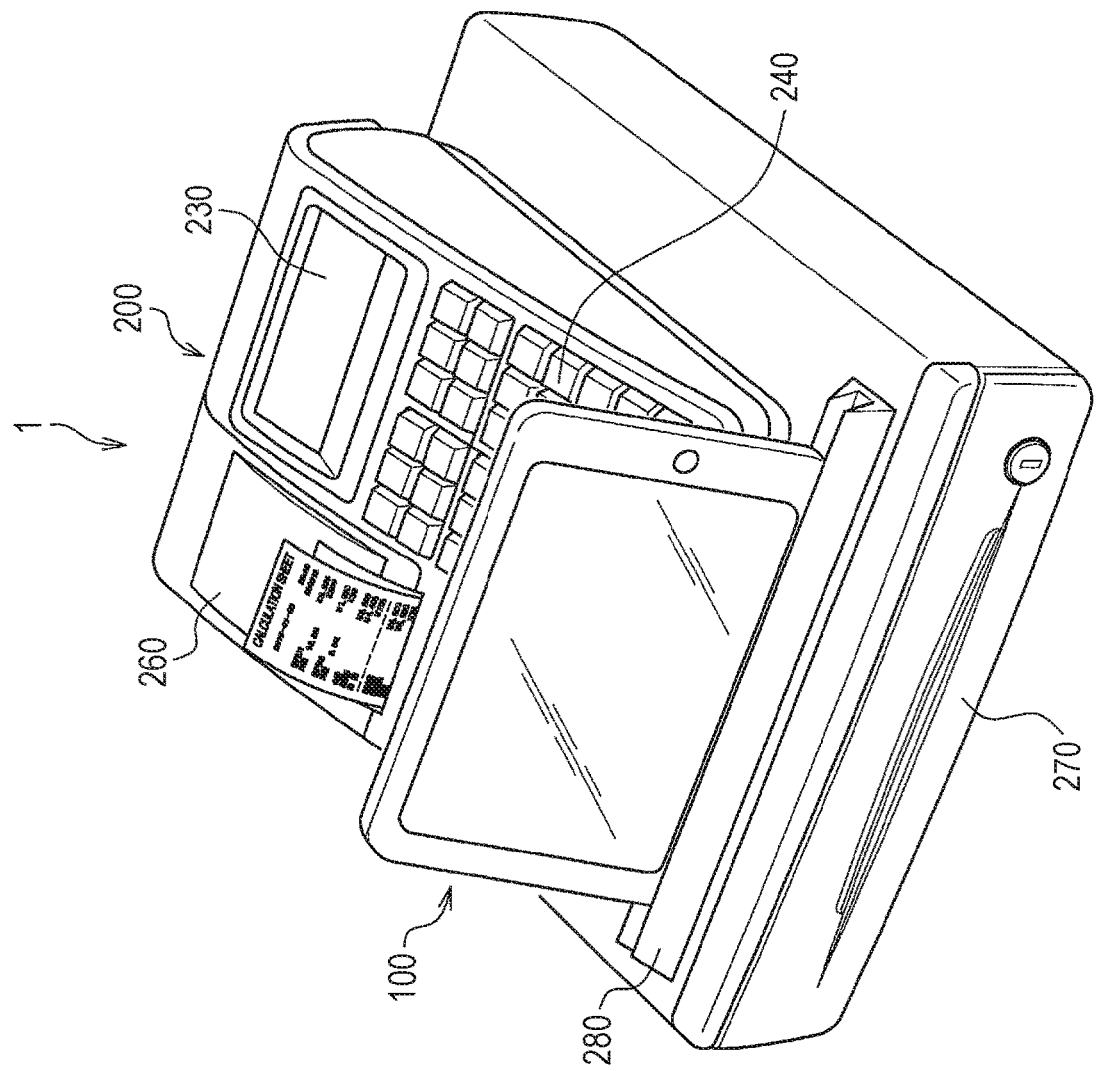
FIG. 2 is a perspective view illustrating an appearance of the sales data processing system that is the embodiment of the present invention.

FIG. 1 is a configuration diagram of a sales data processing system that is an embodiment of the present invention, and FIG. 2 is a perspective view illustrating an appearance of the sales data processing system that is the embodiment of the present invention.

A sales data processing system 1 includes an electronic device 100 and a sales data processing apparatus 200 that can be connected to each other by near field communication. Note that, the electronic device 100 can be used placed on the sales data processing apparatus 200.

The electronic device 100 is a tablet terminal including a display operation unit 10, a communication unit 20, an acceleration sensor 30, a read only memory (ROM) 40, a random access memory (RAM) 45, and a control unit 50. The display operation unit 10 is a touch panel in which a display function and an operation function are integrated together. The acceleration sensor 30 is a sensor that detects an acceleration (including gravitational acceleration) received by the electronic device 100, and detects that the electronic device 100 is shaken, for example, when a user shakes the electronic device 100.

The sales data processing apparatus 200 includes a communication unit 220, a display unit 230, a customer display unit 235, an operation unit 240, a control unit 250, a printing unit 260, a drawer 270 (FIG. 2), a fixing stand 280 (FIG. 2), a ROM 290, and a RAM 295. The display unit 230 is a liquid crystal display (LCD) or a light emitting diode (LED), and mainly displays numbers indicating unit prices or a total of products or services (hereinafter referred to as products and the like). The customer display unit 235 is a display that is provided on an opposite side of the display unit 230 and by which a customer confirms an amount of money and the like. The operation unit 240 includes a numeric keypad and the like configured by a plurality of switches.

The communication units 20 and 220 each are hardware that performs near field communication such as Bluetooth (registered trademark) or Wi-Fi (registered trademark). The ROMs 40 and 290 are non-volatile storage units in which an operating system (OS) and programs are stored. The RAMs 45 and 295 are non-volatile storage units used as working memories. The printing unit 260 is a thermal transfer printer that prints a receipt. The drawer 270 is a device that stores coins, bills, and the like in denominations. The fixing stand 280 is a stand for placing the electronic device 100 on the top of the sales data processing apparatus 200.

The control unit 50 is a central processing unit (CPU), and implements functions of a sales registration unit 51, a display operation control unit 52, and a function substitution control unit 53 by execution of the OS and the program. The sales registration unit 51 is a functional unit that manages from receiving an order for a product and the like to receiving a payment. The display operation control unit 52 is a functional unit that displays on the display operation unit 10 a sales registration screen, and executes processing in association with the sales registration unit 51. The function substitution control unit 53 executes control for substituting the display unit 230 or the operation unit 240 of the sales data processing apparatus 200 for part of the function of the display operation unit 10. In other words, the function substitution control unit 53 displays on the display unit 230 part of the sales registration screen (for example, a number indicating the unit price and the total), and causes the operation unit 240 to perform part of the operation function corresponding to the sales registration screen. For this purpose, the function substitution control unit 53 causes the communication unit 20 to transmit a substitution instruction and a substitution content to the sales data processing apparatus 200.

The control unit 250 is a CPU, and implements functions of the sales registration unit 51 and the display operation control unit 52 by execution of the OS and the program. The sales registration unit 251 is a functional unit that manages from receiving an order for a product and the like to receiving a payment. The display operation control unit 252 is a functional unit that displays on the display unit 230 unit prices and a total of products and the like, and accepts an input performed by the operation unit 240. In particular, in the present embodiment, the display operation control unit 252 displays on the display unit 230 the substitution content, or causes an input content of the operation unit 240 to be transmitted to the electronic device 100, on the basis of the substitution instruction received by the communication unit 220.

Figure 3:
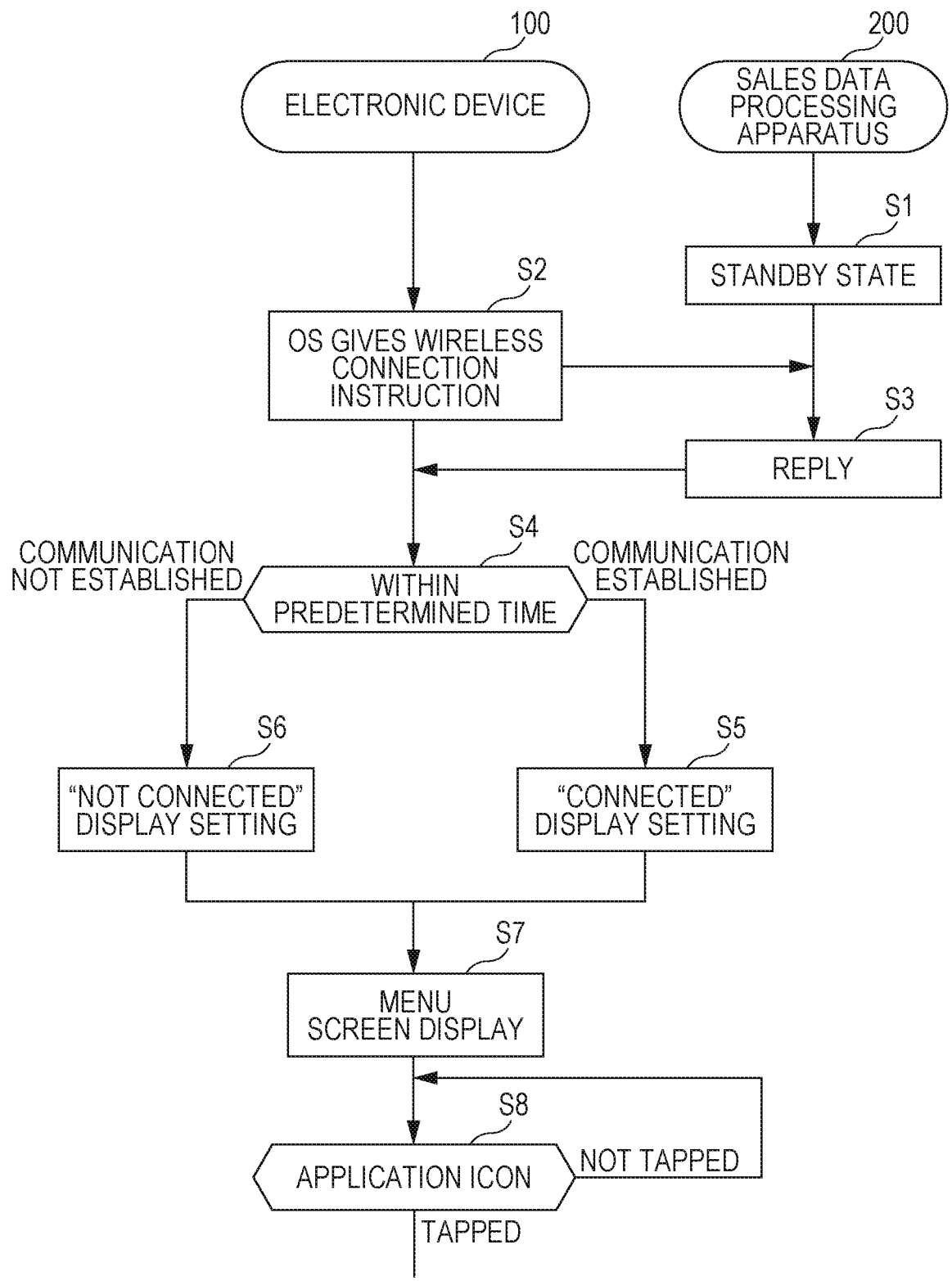
FIG. 3 is a flowchart describing communication operation of the sales data processing system that is the embodiment of the present invention.

FIG. 3 is a flowchart describing communication operation of the sales data processing system that is the embodiment of the present invention, and mainly describes operation when the control unit 50 of the electronic device 100 executes the OS.

When the sales data processing apparatus 200 is in a standby state (S1), the control unit 50 of the electronic device 100 gives a wireless connection instruction to the sales data processing apparatus 200 (S2). The control unit 250 of the sales data processing apparatus 200 performs reply processing to the wireless connection instruction, to the electronic device 100 (S3). The control unit 50 of the electronic device 100 determines whether communication has been established within a predetermined time, that is, whether a reply to the wireless connection instruction has occurred within the predetermined time (S4). When communication is established within the predetermined time ("communication established" in S4), the control unit 50 of the electronic device 100 performs setting so that "connected" is displayed on a communication setting screen 310 (FIG. 4) (S5). On the other hand, when communication is not established within the predetermined time, that is, when the reply to the wireless connection instruction has not occurred within the predetermined time ("communication not established" in S4), the control unit 50 of the electronic device 100 performs setting so that "not connected" is displayed on the communication setting screen 310 (S6). After the processing of S5 or S6, the control unit 50 of the electronic device 100 displays a menu screen (S7), and waits until an application icon is tapped (S8).

Figure 4:
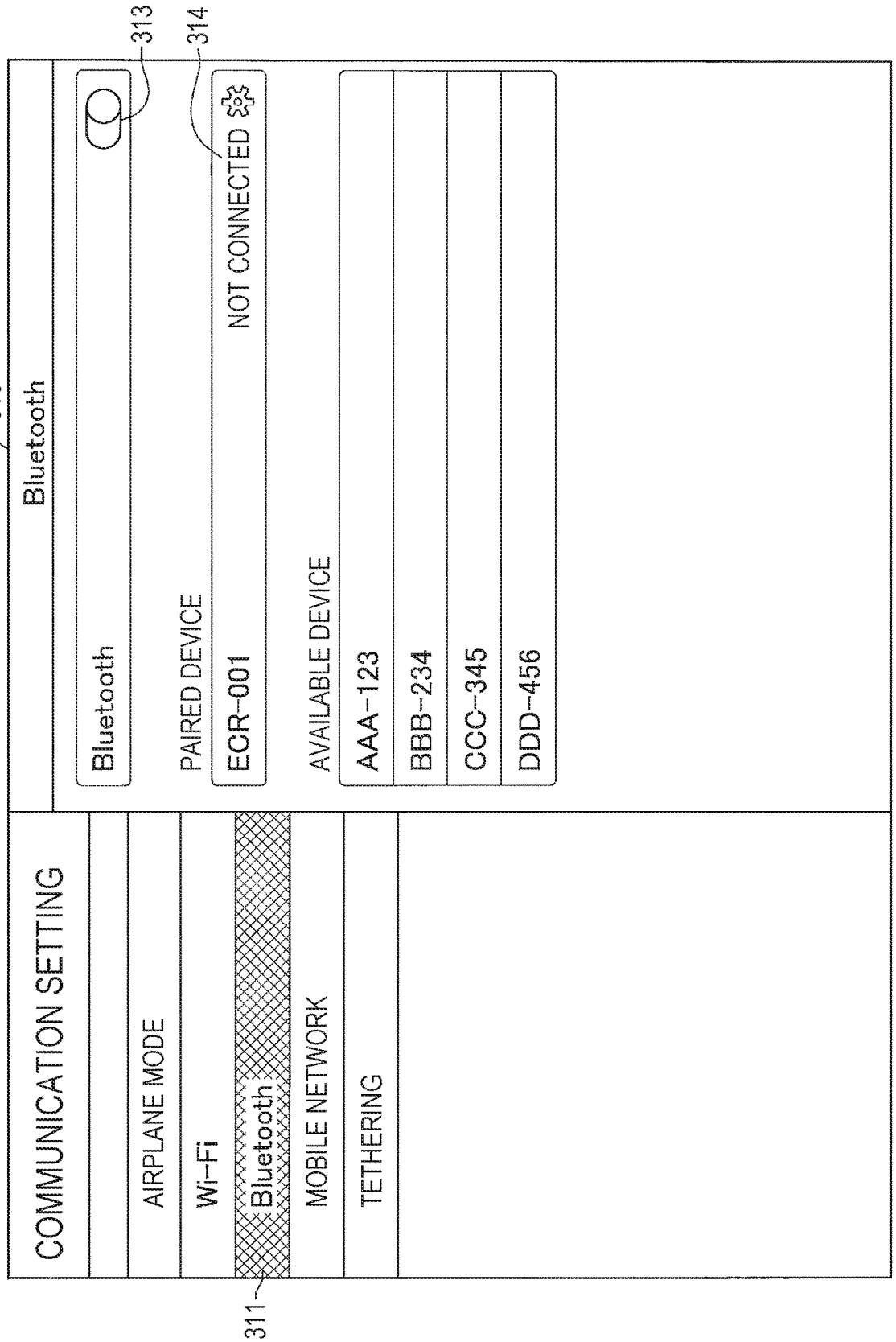
FIG. 4 is a diagram illustrating an example of a communication setting screen illustrating a communication state of an electronic device.

FIG. 4 is a diagram illustrating an example of the communication setting screen illustrating a communication state of the electronic device.

The communication setting screen 310 is a screen displayed when a "communication setting" button (not illustrated) is tapped on the menu screen of the electronic device 100. The communication setting screen 310 includes a "Bluetooth (registered trademark)" setting display button 311, a "Bluetooth (registered trademark)" on/off setting switch 313, and a "Bluetooth (registered trademark)" status display 314.

The "Bluetooth (registered trademark)" setting display button 311 is a button tapped when communication setting is performed of Bluetooth (registered trademark) among communication modes of "airplane mode", "Wi-Fi (registered trademark)", "Bluetooth (registered trademark)", "mobile network", and "tethering". When the "Bluetooth (registered trademark)" setting display button 311 is tapped, a setting screen in the right field is displayed. The "Bluetooth (registered trademark)" on/off setting switch 313 is a switch for selecting use/non-use of Bluetooth (registered trademark). The "Bluetooth (registered trademark)" status display 314 is an area for displaying whether the electronic device 100 and the sales data processing apparatus 200 are "not connected" or "connected" together in Bluetooth (registered trademark). Note that, the display example of FIG. 4 indicates that the electronic device 100 is "not connected" to "ECR-001" indicating that a "paired device" is the sales data processing apparatus 200. Note that, in the display example of FIG. 4, multiple names of other available devices are displayed.

Figure 5:
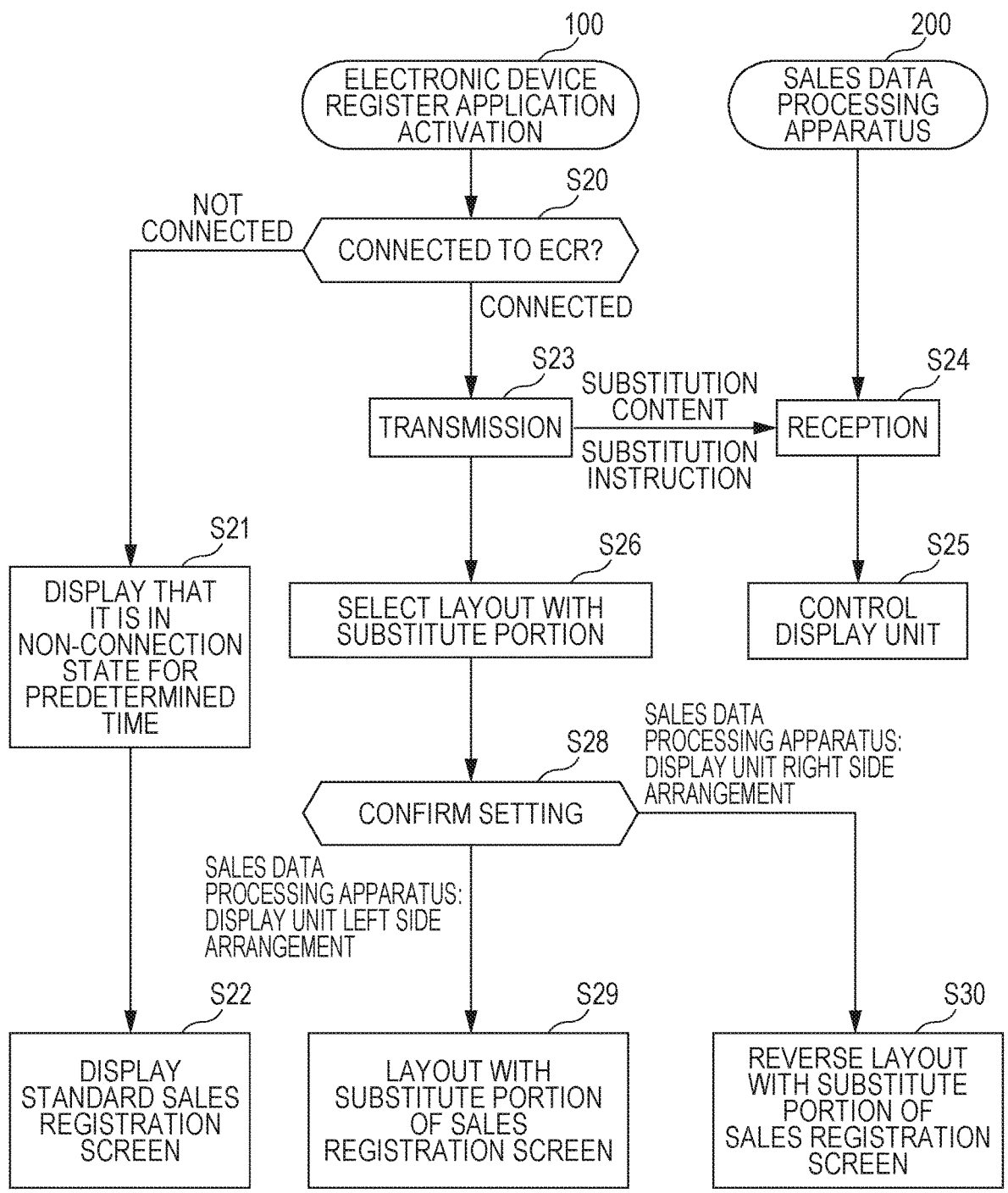
FIG. 5 is a flowchart describing display operation of the sales data processing system that is the embodiment of the present invention.

FIG. 5 is a flowchart describing display operation of the sales data processing system that is the embodiment of the present invention. This routine is activated when the cash register application icon is tapped on the menu screen of the electronic device 100.

The control unit 50 of the electronic device 100 determines whether the electronic device 100 is communicably connected wirelessly to the sales data processing apparatus 200 (ECR) (S20). When not connected to the sales data processing apparatus 200 ("not connected" in S20), the control unit 50 of the electronic device 100 displays that it is in a non-connection state on the display operation unit 10 for a predetermined time (S21), and displays a standard sales registration screen on the display operation unit 10 (S22).

Figure 6:
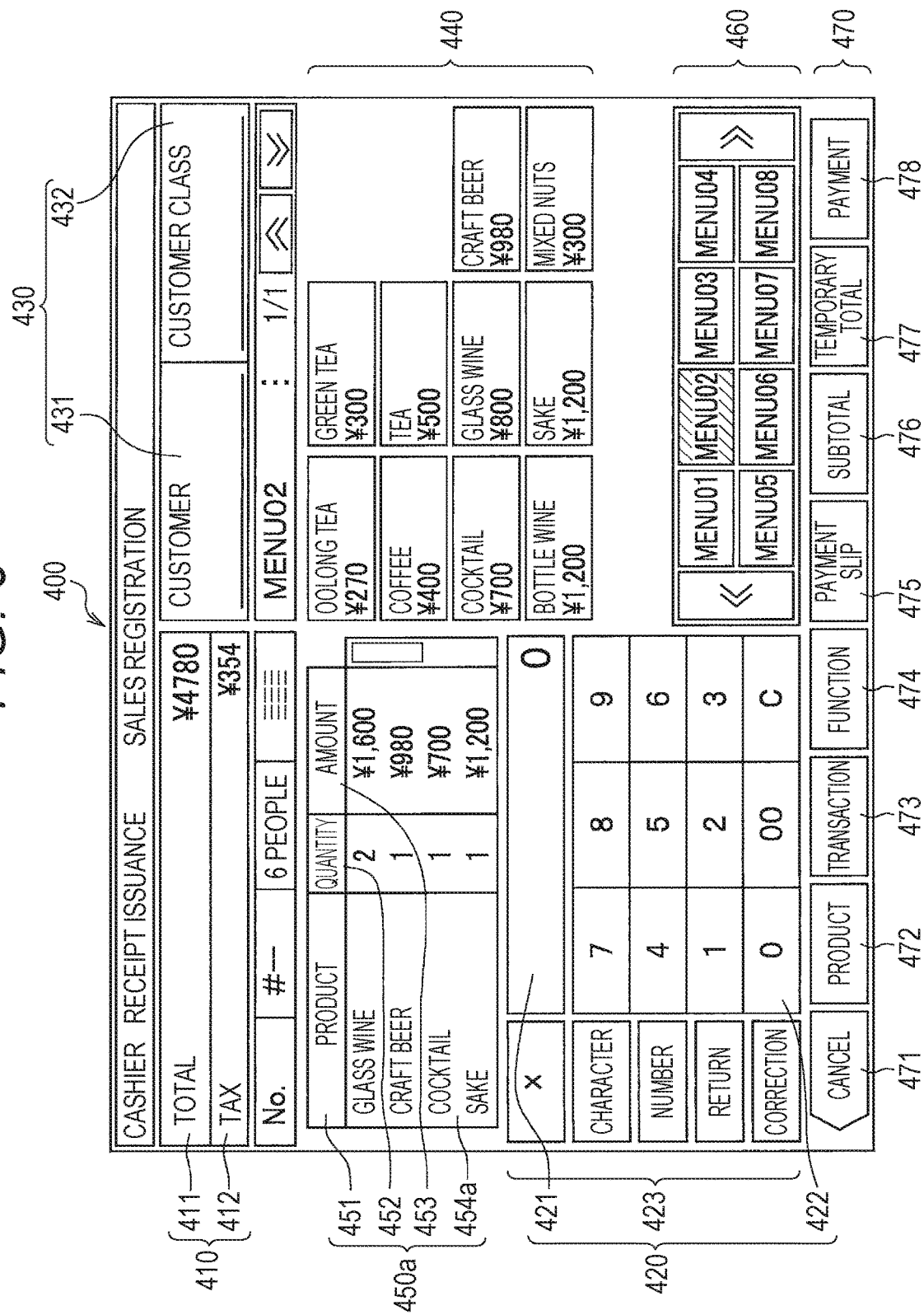
FIG. 6 is a diagram illustrating an example of a standard sales registration screen.

FIG. 6 is a diagram illustrating an example of the standard sales registration screen.

A standard sales registration screen 400 includes a subtotal field 410, a numeric keypad field 420, a "customer" field 430, a product selection field 440, an item field 450a, a "MENU" selection field 460, and a screen selection field 470. The subtotal field 410, the numeric keypad field 420, and the item field 450a are arranged on the left side, and the "customer" field 430, the product selection field 440, and the "MENU" selection field 460 are arranged on the right side. In addition, the subtotal field 410 and the item field 450a are vertically juxtaposed with each other.

The subtotal field 410 includes a "total" display field 411 and a "tax" display field 412 vertically juxtaposed with each other. Here, as a specific example, a total "[YEN]4780 " (hereinafter, "[YEN]" is used to represent a Yen symbol in figures of this application) and a tax "[YEN]354" are displayed. The numeric keypad field 420 includes a number display field 421, a numeric keypad 422, and a function button 423. The "customer" field 430 includes a "customer" specification field 431 and a "customer class" designation field 432 arranged side by side on the left and right. The product selection field 440 includes multiple product selection buttons. The "MENU" selection field 460 includes multiple MENU buttons. For example, when "MENU 02" is tapped, a tavern menu as illustrated in FIG. 6 is displayed in the product selection field 440. The screen selection field 470 includes a "cancel" button 471, a "product" button 472, a "transaction" button 473, a "function" button 474, a "payment slip" button 475, a "subtotal" button 476, a "temporary total" button 477, and a "payment" button 478.

The item field 450a includes a "product name" list field 451, a "quantity" display field 452, and an "amount" display field 453 arranged in the left-right direction together with a blank area 454a. The number of item lines of four lines is secured in the item field 450a. For example, four lines are displayed of: a product name "glass wine", quantity "2", and amount "[YEN]1,600"; a product name "craft beer", quantity "1", and amount "[YEN]980"; a product name "cocktail", quantity "1", and amount "[YEN]700"; and a product name "sake", quantity "1", and amount "[YEN]1,200". Note that, the lower part of the blank area 454a is blank when the number of products is small.

FIG. 7 is a diagram illustrating an example of a screen on which all items are displayed.

Although an all items field 480 is displayed by moving a scroll bar attached to the right side of the item field 450a (FIG. 6), it may be displayed on another screen. In the item field 450a of FIG. 6, the display remains in four lines, but in the all items field 480, a product name "green tea", quantity "1", and amount "[YEN]300" are displayed in the fifth line. That is, in the subtotal field 410 (FIG. 6), the total amount "[YEN]4780" and the tax "[YEN]354" of these five types and six products are displayed.

Referring back to the flowchart of FIG. 5, when connected to the sales data processing apparatus 200 ("connected" in S20), the control unit 50 of the electronic device 100 transmits a substitution instruction and a substitution content to the sales data processing apparatus 200 (S23). That is, the control unit 50 of the electronic device 100 instructs the sales data processing apparatus 200 to substitute either one or both of the display unit 230 and the operation unit 240 for part of the function of the display operation unit 10. In addition, the control unit 50 of the electronic device 100 transmits a display content to be displayed on the display unit 230 to the sales data processing apparatus 200, and receives the input content input by the operation unit 240 from the sales data processing apparatus 200.

The control unit 250 of the sales data processing apparatus 200 receives the substitution instruction and the substitution content (S24), and controls the display unit 230 and the operation unit 240 on the basis of the received substitution instruction (S25). After the processing of S23, the control unit 50 of the electronic device 100 selects a layout with a substitute portion (S26). That is, the control unit 50 of the electronic device 100 selects a screen of a layout in which a subtotal display (subtotal field 410) hidden from the standard sales registration screen 400 (FIG. 6).

After the processing of S26, the control unit 50 of the electronic device 100 confirms whether the sales data processing apparatus 200 includes the display unit 230 arranged on the right side or the sales data processing apparatus 200 includes the display unit 230 arranged on the left side (S28). When the sales data processing apparatus 200 includes the display unit 230 arranged on the left side ("sales data processing apparatus: display unit left side arrangement" in S28), the control unit 50 of the electronic device 100 displays the layout with the substitute portion of the sales registration screen (S29). That is, the control unit 50 of the electronic device 100 displays the sales registration screen 401 (FIG. 8) in which the subtotal display (subtotal field 410) is hidden.

In the sales registration screen 401, the subtotal field 410 (FIG. 6) is hidden, and instead of the item field 450*a* (FIG. 6), the blank area 454*a* is expanded vertically in a non-display area, and an item field 450*b* is provided including a blank area 454*b* expanded. At this time, the product name "green tea", quantity "1", and amount "[YEN]300", which were not displayed in the blank area 454*a*, are displayed in the blank area 454*b*. In addition, on the display unit 230 of the sales data processing apparatus 200, substitution display is performed of the total "[YEN]4780" and the tax "[YEN]354" hidden on the subtotal field 410 (FIG. 6).

Figure 9:
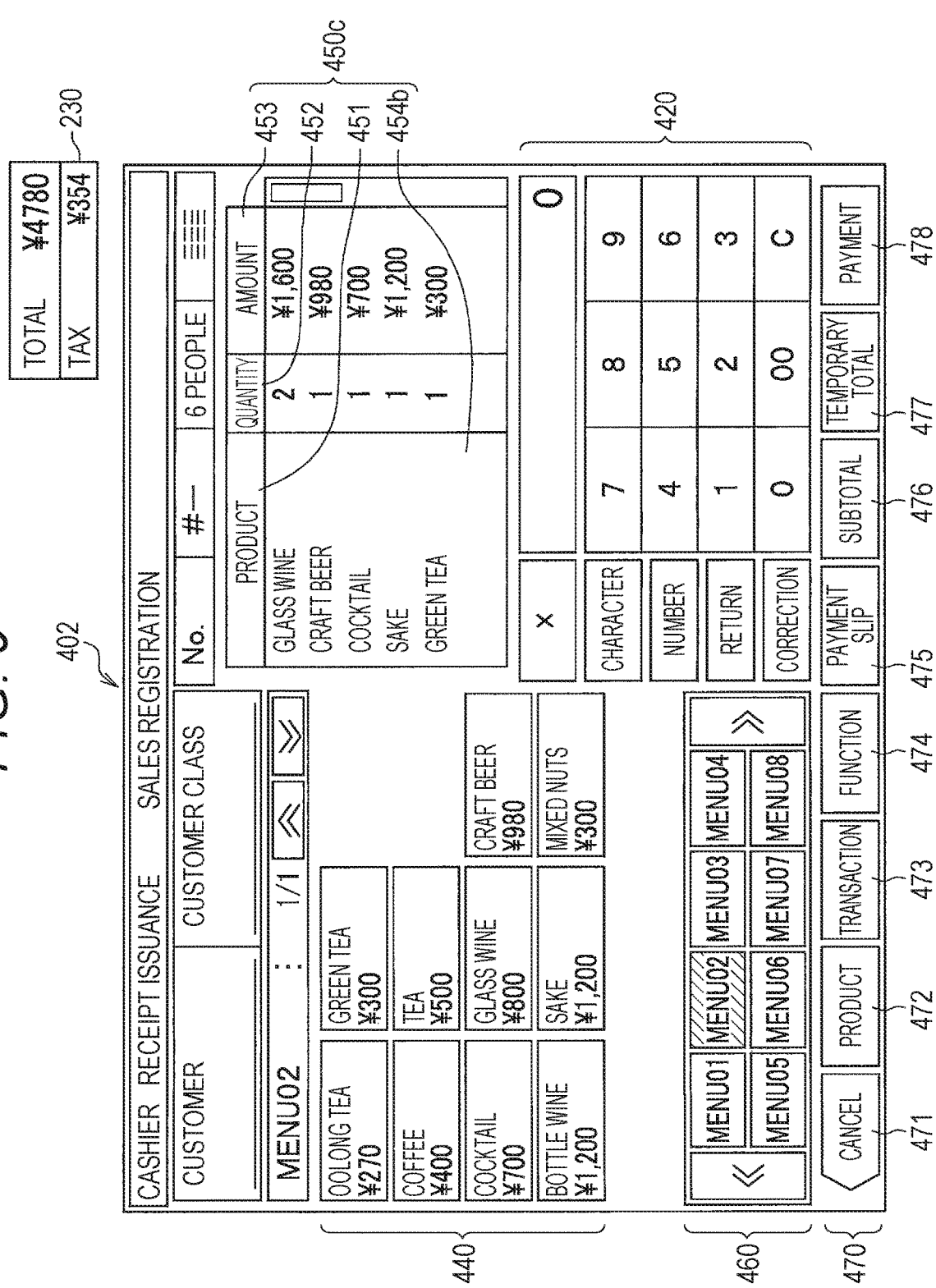
FIG. 9 is a diagram illustrating an example of the sales registration screen in which the subtotal display is hidden from the standard sales registration screen and the left and right sides are reversed, and an example of the screen displayed on the display unit of the sales data processing apparatus.

On the other hand, when the sales data processing apparatus 200 includes the display unit 230 arranged on the right side ("sales data processing apparatus: display unit right side arrangement" in S28), the control unit 50 of the electronic device 100 displays a reverse layout with the substitute portion of the sales registration screen (S30). That is, the control unit 50 of the electronic device 100 displays on the display operation unit 10 a sales registration screen 402 (FIG. 9) in which an item field 450*c* is provided obtained by horizontally reversing position of the item field 450*a* (FIG. 6) by swapping the item field 450*a* (FIG. 6) and the numeric keypad field 420 with the product selection field 440 and the "MENU" selection field 460 of the sales registration screen (S30). At this time, on the display unit 230 of the sales data processing apparatus 200, substitution display is performed of the total "[YEN]4780" and the tax "[YEN]354" hidden on the subtotal field 410 (FIG. 6).

Figure 10:
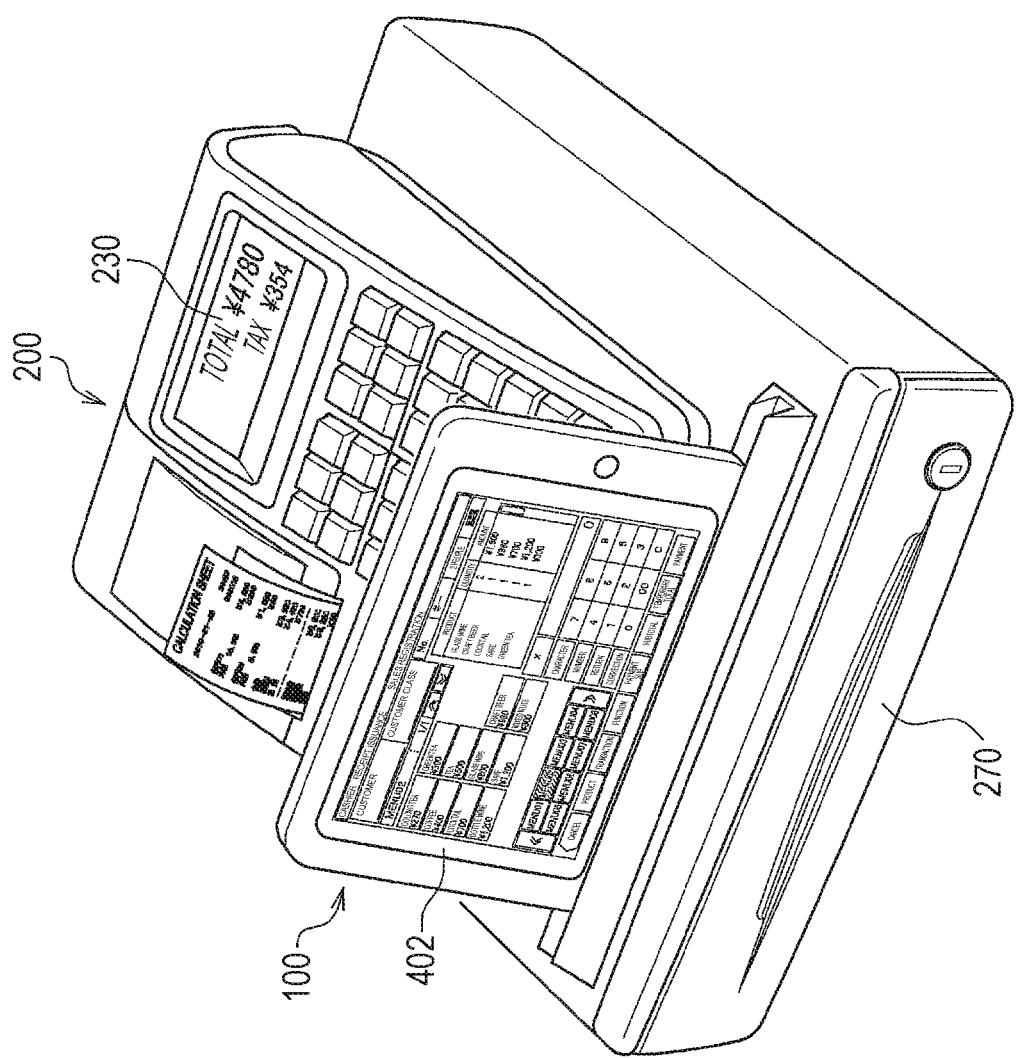
FIG. 10 is a perspective view illustrating an appearance of the sales data processing system in which substitution display is performed with the sales registration screen in which the left and right sides are reversed.

FIG. 10 is a perspective view illustrating an appearance of the sales data processing system that displays the sales registration screen in which the left and right sides are reversed.

On the display operation unit 10 of the electronic device 100, the sales registration screen 402 (FIG. 9) is displayed. In addition, on the display unit 230 of the sales data processing apparatus 200, substitution display is performed of the total "[YEN]4780" and the tax "[YEN]354" of the subtotal field 410 hidden on the sales registration screen 402.

Figure 8:
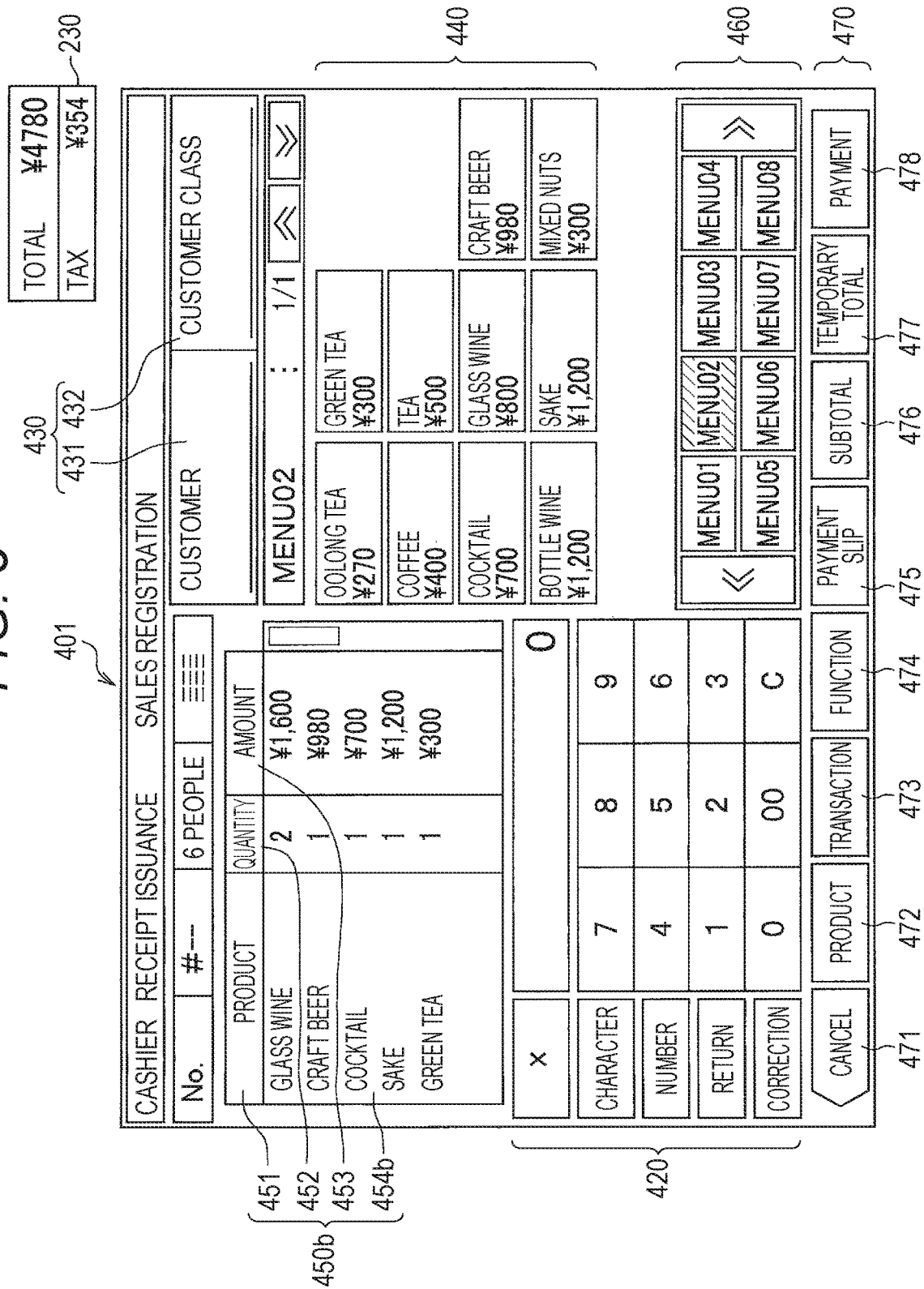
FIG. 8 is a diagram illustrating an example of a sales registration screen in which a subtotal display is hidden from the standard sales registration screen, and an example of a screen displayed on a display unit of a sales data processing apparatus.

In the standard sales registration screen 400 (FIG. 6), the subtotal field 410 and the item field 450*a* are vertically juxtaposed, and it is easy to confirm the total (subtotal) of the products displayed in the item field 450*a*. Similarly, even when the electronic device 100 is placed on the sales data processing apparatus 200, it is preferable to arrange the item field 450*c* on a side closer to the display unit 230. For this reason, when the sales data processing apparatus 200 includes the display unit 230 arranged on the right side, it is preferable that the display unit 230 displays the sales registration screen 402 (FIG. 9) in which the item field 450*c* is provided obtained by horizontally reversing the position of the item field 450*b* (FIG. 8).

According to the sales data processing system 1 of the present embodiment, when the electronic device 100 and the sales data processing apparatus 200 are communicably connected together, the control unit 50 of the electronic device 100 substitutes the display unit 230 of the sales data processing apparatus 200 for part of the display function of the display operation unit 10 (for example, display of the subtotal field 410). At this time, the control unit 50 displays on the display operation unit 10 the sales registration screen 401 (FIG. 8) including, as another display element other than the subtotal field 410 of the item field 450*a*, the item field 450*b* to which a field is added, for example, by hiding the subtotal field 410 and vertically expanding the blank area 454*a*, instead of the standard sales registration screen 400 (FIG. 6).

Second Embodiment

In the first embodiment, the display content of the subtotal field 410 to be displayed by the display operation unit 10 is displayed by the display unit 230 of the sales data processing apparatus 200; however, it is possible to cause the operation unit 240 of the sales data processing apparatus 200 to perform part of the operation function of the display operation unit 10 (for example, the numeric keypad field 420).

A configuration of a sales data processing system of a second embodiment is the same as the configuration of the sales data processing system 1 of the first embodiment.

Figure 11:
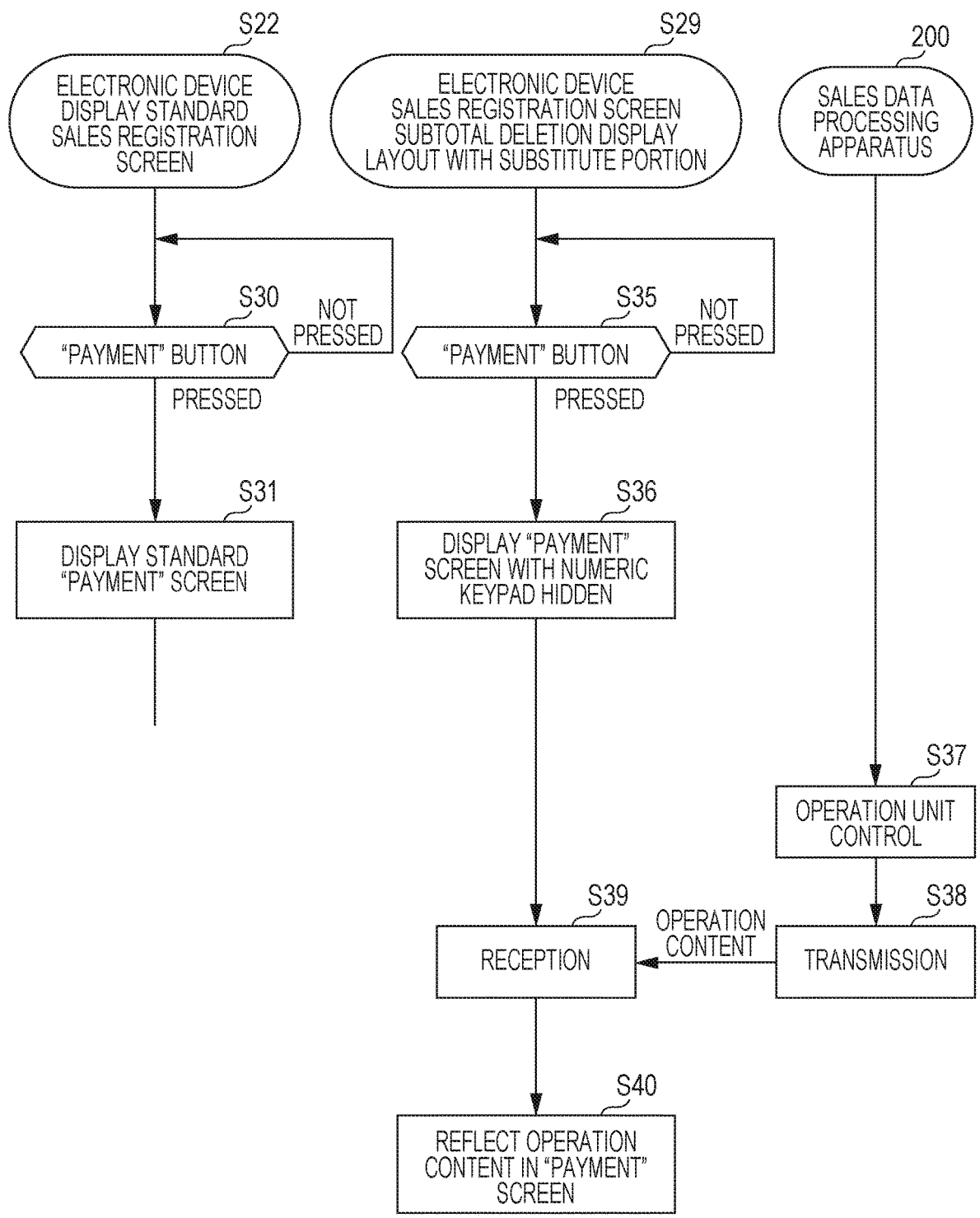
FIG. 11 is a flowchart describing operation when a "payment" button is tapped on the sales registration screen.

FIG. 11 is a flowchart describing operation after the sales registration screen is displayed. That is, FIG. 11 describes operation when the standard sales registration screen 400 (FIG. 6) is displayed that is displayed when the electronic device 100 is not connected to the ECR (S22), or when the sales registration screen 401 (FIG. 7) is displayed that is displayed when the electronic device 100 is connected to the ECR (S29), in the flowchart of FIG. 5.

When the standard sales registration screen 400 (FIG. 6) is displayed (S22), the control unit 50 of the electronic device 100 determines whether the "payment" button 478 of the standard sales registration screen 400 is tapped (S30). When the "payment" button 478 is not tapped (not tapped at S30), the control unit 50 waits until the button is tapped. When the "payment" button 478 is tapped, the control unit 50 of the electronic device 100 displays a standard "payment" screen 500 (S31).

The standard "payment" screen 500 includes an item field 510, a total field 530, a deposit amount field 535, a numeric keypad field 520, a "cash" button 540, and a "return" button 545. Here, the item field 510 is arranged on the left side of the screen, and the total field 530, the deposit amount field 535, the numeric keypad field 520, the "cash" button 540, and the "return" button 545 are arranged on the right side of the screen. Note that, in the display example of FIG. 12, a product name "sake" and a unit price "[YEN]1,200" are described in the item field 510, and a total amount "[YEN]1,200" and an included tax "[YEN]89" is described in the total field 530, and it is described in the deposit amount field 535 that the customer has deposited cash "[YEN]2,000".

Returning to the description of FIG. 11, when the sales registration screen 401 (FIG. 8) is displayed as the layout with the substitute portion (S29), the control unit 50 of the electronic device 100 waits until the "payment" button 478 of the sales registration screen 401 is tapped (S35). When the "payment" button 478 is tapped, the control unit 50 of the electronic device 100 displays a "payment" screen 501 (FIG. 13) in which the numeric keypad field 520 is hidden from the standard "payment" screen 500 (FIG. 12) (S36).

The display example of the "payment" screen 501 includes the item field 510, a "today's sales amount" field 550, the total field 530 including the total amount "[YEN]1,200" and the included tax "[YEN]89", the deposit amount field 535, an added tax display field 560 including an added tax amount "89 yen" and a taxable amount "1,111 yen", the "cash" button 540, and the "return" button 545. That is, as compared to the standard "payment" screen 500, in the "payment" screen 501, the numeric keypad field 520 is hidden, and the "today's sales amount" field 550 and the added tax display field 560 are provided in an area where the numeric keypad field 520 is hidden.

Figure 12:
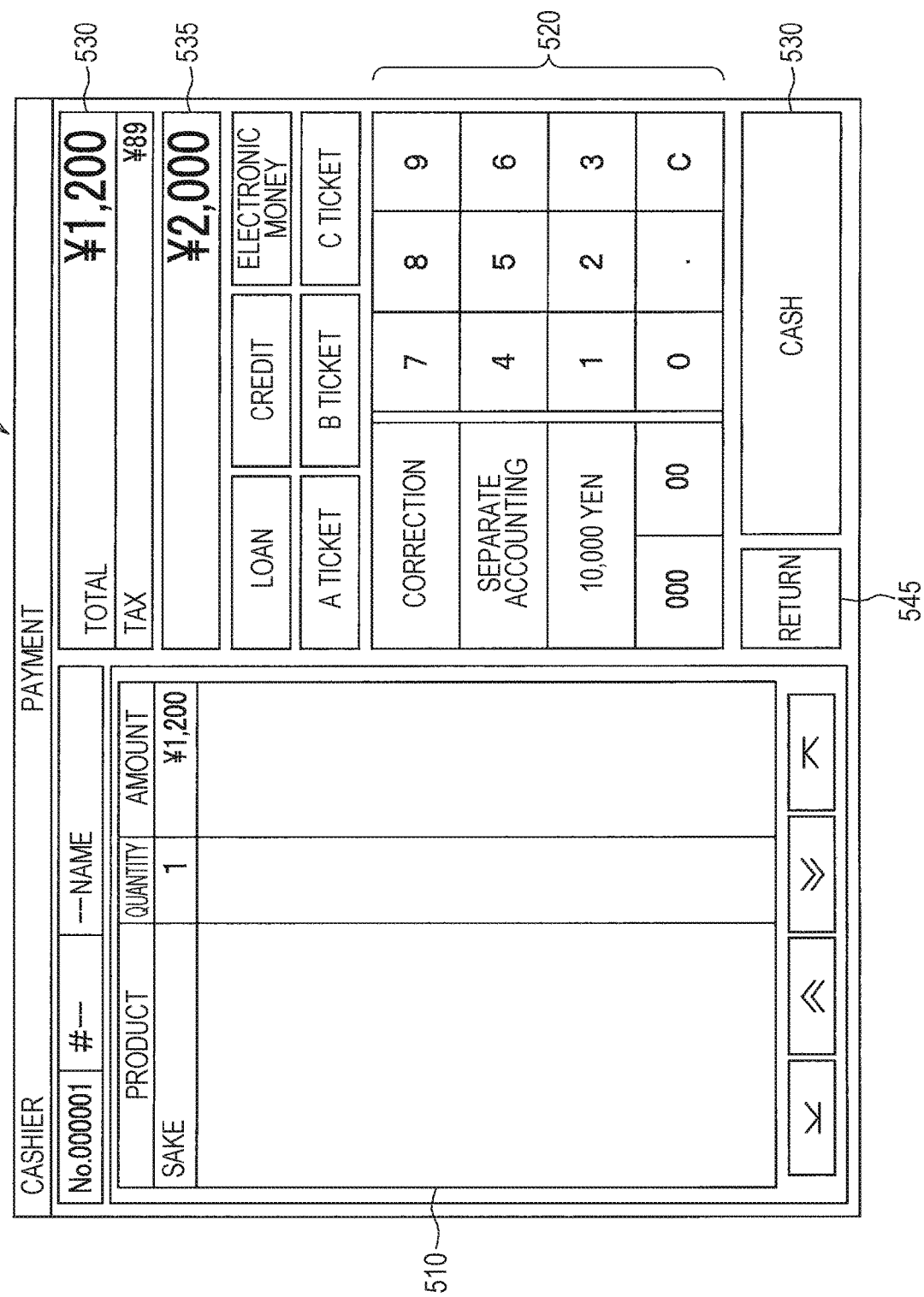
FIG. 12 is an example of a standard "payment" screen.
Figure 13:
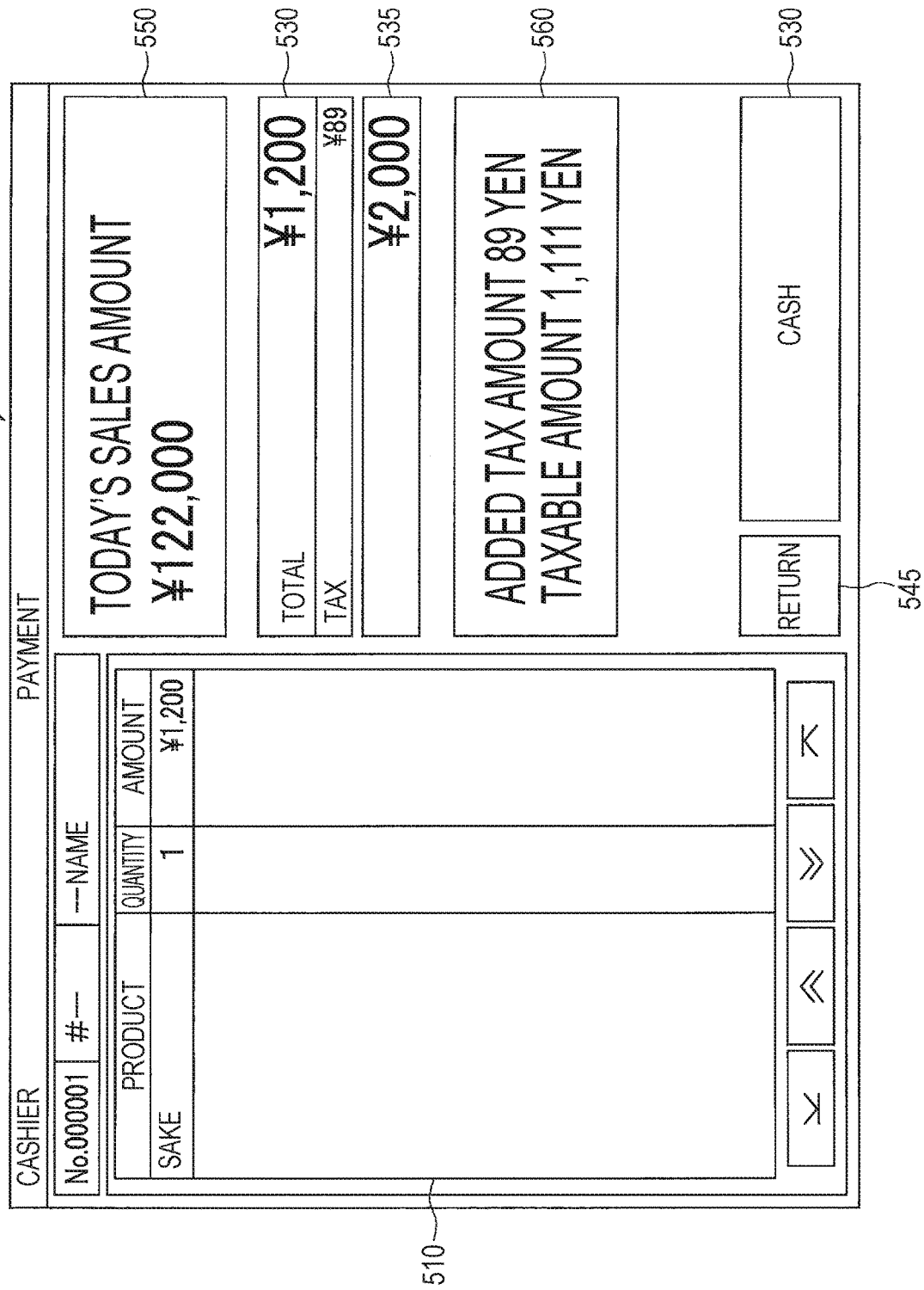
FIG. 13 is an example of a "payment" screen in which a numeric keypad field is hidden from the standard "payment" screen.

According to the sales data processing system of the present embodiment, when the electronic device 100 and the sales data processing apparatus 200 are communicably connected together, the control unit 50 of the electronic device 100 substitutes the operation unit 240 of the sales data processing apparatus 200 for part of the function of the display operation unit 10 (for example, the display function and operation function of the numeric keypad field 420). At this time, for example, the control unit 50 displays on the display operation unit 10 the "payment" screen 501 (FIG. 13) in which the numeric keypad field 520 is hidden from the standard "payment" screen 500 (FIG. 12). In addition, the control unit 50 may display the "today's sales amount" field 550 and the added tax display field 560 in the non-display area where the numeric keypad field 520 is hidden.

Third Embodiment

When communicably connected to the sales data processing apparatus 200, the control unit 50 of the electronic device 100 of the first embodiment displays on the display operation unit 10 the sales registration screen 401 in which the subtotal field 410 is hidden from the standard sales registration screen 400. In the control unit 50 of the electronic device 100, when the acceleration sensor 30 (FIG. 1) detects that the electronic device 100 is shaken, after the detection, the control unit 50 may perform switching between the standard sales registration screen 400 and the sales registration screen 401.

A configuration of a sales data processing system of a third embodiment is the same as the configuration of the sales data processing system 1 of the first embodiment. In the control unit 50, when a value of an output signal of the acceleration sensor 30 fluctuates, and then only gravity is detected, the switching is completed between the standard sales registration screen 400 and the sales registration screen 401.

The invention claimed is:

1. An electronic device including a display operation unit in which a display function and an operation function are integrated together, the electronic device comprising a processor configured to:
control the display operation unit to display a first display screen including a plurality of display elements, and
execute, when communication connection is made with a predetermined sales data processing apparatus, control processing of substituting at least one of a display unit and an operation unit arranged on the sales data processing apparatus for at least part of a function of the display operation unit, the display unit being arranged at a fixed position on the sales data processing apparatus,
wherein:
in the control processing, when substituting said at least one of the display unit and the operation unit of the sales data processing apparatus for said at least part of the function of the display operation unit, the processor is configured to control the display operation unit to display a second display screen instead of the first display screen;
the second display screen includes the plurality of display elements displayed in the first display screen, except for at least one display element from among the plurality of display elements which is used to implement said at least part of the function of the display operation unit for which said at least one of the display unit and the operation unit of the sales data processing apparatus is substituted, said at least one display element being omitted from the plurality of display elements displayed in the second display screen on the display operation unit;

in the control processing, the processor performs control such that said at least part of the function of the display operation unit is instead implemented by said at least one of the display unit and the operation unit arranged on the sales data processing apparatus; and
in the control processing, the processor is configured to determine whether the display unit, which is arranged at the fixed position on the sales data processing apparatus, is arranged on a right side or a left side of the sales data processing apparatus, and to display the plurality of display elements in the second display screen in a layout selected based on a result of the determination, the layout differing depending on the result of the determination.

2. The electronic device according to claim 1, wherein:
the processor is further configured to execute detection processing of detecting communication connection with the sales data processing apparatus, and
when the communication connection is detected by the detection processing, the processor executes the control processing of substituting said at least one of the display unit and the operation unit arranged on the sales data processing apparatus for said at least part of the function of the display operation unit, and
when the communication connection is not detected by the detection processing, the processor cancels execution of the control processing.

3. The electronic device according to claim 1, wherein:
a display element among the plurality of display elements in the second display screen which are not omitted includes a plurality of fields, and
in the control processing, the processor controls the display control unit to display the second display screen such that, in the second display screen, a number of the plurality of fields is increased.

4. The electronic device according to claim 1, wherein:
the electronic device is configured to be placed on the sales data processing apparatus including the display unit arranged on the left side or the right side of the sales data processing apparatus, and
in a state in which the electronic device is placed on the sales data processing unit, the processor is configured, in the control processing, when causing the display unit of the sales data processing apparatus to perform substitution display of subtotal information displayed on the display operation unit, to control the display control unit to display item information constituting the subtotal information on a side of the display operation unit closer to the display unit.

5. The electronic device according to claim 1, wherein the processor is configured, when communication connection is not made with the sales data processing apparatus, to control the display operation unit to display, among the plurality of display elements included in the first display screen, a display element of the display unit to be substituted when the communication connection is made with the sales data processing apparatus.

6. The electronic device according to claim 1, wherein the processor is configured, when communication connection is not made with the sales data processing apparatus, to control the display operation unit to display, among the plurality of display elements included in the first display screen, a display element corresponding to the operation unit to be substituted when the communication connection is made with the sales data processing apparatus.

7. The electronic device according to claim 1, wherein, when substituting the display unit for said at least part of the display function of the display operation unit, the processor controls the display control unit to display the second display screen such that, in the second display screen, a display element among the plurality of display elements which are not omitted is expanded or enlarged so as to occupy an area in the second display screen corresponding an area in the first display screen where said at least one display element that is omitted from the second display screen was displayed.

8. A sales data processing system comprising a sales data processing apparatus and an electronic device communicably connected to each other, the sales data processing apparatus including a display unit and an operation unit, the display unit being arranged at a fixed position on the sales data processing apparatus, and the electronic device including a display operation unit in which a display function and an operation function are integrated together,
wherein:
the electronic device includes a processor configured to execute, when communication connection is made with the sales data processing apparatus, control processing of substituting at least one of the display unit and the operation unit for at least part of a function of the display operation unit,
in the control processing, when substituting said at least one of the display unit and the operation unit of the sales data processing apparatus for said at least part of the function of the display operation unit, the processor is configured to control the display operation unit to display a second display screen instead of the first display screen;
the second display screen includes the plurality of display elements displayed in the first display screen, except for at least one display element from among the plurality of display elements which is used to implement said at least part of the function of the display operation unit for which said at least one of the display unit and the operation unit of the sales data processing apparatus is substituted, said at least one display element being omitted from the plurality of display elements displayed in the second display screen on the display operation unit;
in the control processing, the processor performs control such that said at least part of the function of the display operation unit is instead implemented by said at least one of the display unit and the operation unit arranged on the sales data processing apparatus; and
in the control processing, the processor is configured to determine whether the display unit, which is arranged at the fixed position on the sales data processing apparatus, is arranged on a right side or a left side of the sales data processing apparatus, and to display the plurality of display elements in the second display screen in a layout selected based on a result of the determination, the layout differing depending on the result of the determination.

9. The sales data processing system according to claim 8, wherein:
the electronic device is configured to be placed on the sales data processing apparatus,
in the sales data processing apparatus, the display unit is arranged on one of both sides of the electronic device in a state in which the electronic device is placed on the sales data processing unit, and
in the state in which the electronic device is placed on the sales data processing unit, the processor is configured, in the control processing, when causing the display unit of the sales data processing apparatus to perform substitution display of subtotal information displayed on the display operation unit, to control the display operation unit to display item information constituting the subtotal information on one side of the display operation unit corresponding to the side of the electronic device on which the display unit is arranged.

10. The sales data processing system according to claim 9, wherein the processor is configured, in the control processing, when not causing the display unit of the sales data processing apparatus to perform substitution display of subtotal information displayed on the display operation unit, to control the display control unit to display the subtotal information and the item information on another side of the display operation unit.

11. The sales data processing system according to claim 8, wherein:
when substituting the display unit for said at least part of the display function of the display operation unit, the processor controls the display control unit to display the second display screen such that, in the second display screen, a display element among the plurality of display elements which are not omitted is expanded or enlarged so as to occupy an area in the second display screen corresponding an area in the first display screen where said at least one display element that is omitted from the second display screen was displayed.

12. A non-transitory computer-readable recording medium having a program stored thereon that is executable by a computer included in a sales data processing system including a display operation unit in which a display function and an operation function are integrated together, and a communication unit configured to make communication connection with a sales data processing apparatus in which a display unit and an operation unit are arranged, the display unit being arranged at a fixed position on the sales data processing apparatus, the program being executable by the computer to control the computer to perform functions comprising:
controlling the display operation unit to display a first display screen including a plurality of display elements,
when communication connection is made with the sales data processing apparatus by the communication unit, executing control processing of substituting at least one of the display unit and the operation unit for at least part of a function of the display operation unit,
wherein:
in the control processing, when substituting said at least one of the display unit and the operation unit of the sales data processing apparatus for said at least part of the function of the display operation unit, the program causes the computer to control the display operation unit to display a second display screen instead of the first display screen;
the second display screen includes the plurality of display elements displayed in the first display screen, except for at least one display element from among the plurality of display elements which is used to implement said at least part of the function of the display operation unit for which said at least one of the display unit and the operation unit of the sales data processing apparatus is substituted, said at least one display element being omitted from the plurality of display elements displayed in the second display screen on the display operation unit;
in the control processing, the program causes the computer to perform control such that said at least part of the function of the display operation unit is instead implemented by said at least one of the display unit and the operation unit arranged on the sales data processing apparatus; and in the control processing, the program causes the computer to determine whether the display unit, which is arranged at the fixed position on the sales data processing apparatus, is arranged on a right side or a left side of the sales data processing apparatus, and to display the plurality of display elements in the second display screen in a layout selected based on a result of the determination, the layout differing depending on the result of the determination.

13. The computer-readable recording medium according to claim 12, wherein:

the display operation unit is configured to be placed on the sales data processing apparatus, in the sales data processing apparatus, the display unit is arranged on one of both sides of the display operation unit in a state in which the display operation unit is placed on the sales data processing apparatus, and the program causes the computer, in the control processing, when causing the display unit of the sales data processing apparatus to perform substitution display of subtotal information displayed on the display operation unit, to control the display operation unit to display item information constituting the subtotal information on the one side of the display operation unit where the display unit is arranged.

14. The computer-readable recording medium according to claim 13, wherein the program causes the computer, in the control processing, when not causing the display unit of the sales data processing apparatus to perform substitution display of subtotal information displayed on the display operation unit, to control the display control unit to display the subtotal information and the item information on another side of the display operation unit.

15. The computer-readable recording medium according to claim 12, when substituting the display unit for said at least part of the display function of the display operation unit, the program causes the computer to control the display control unit to display the second display screen such that, in the second display screen, a display element among the plurality of display elements which are not omitted is expanded or enlarged so as to occupy an area in the second display screen corresponding an area in the first display screen where said at least one display element that is omitted from the second display screen was displayed.

* * * * *